Patented Feb. 26, 1929.

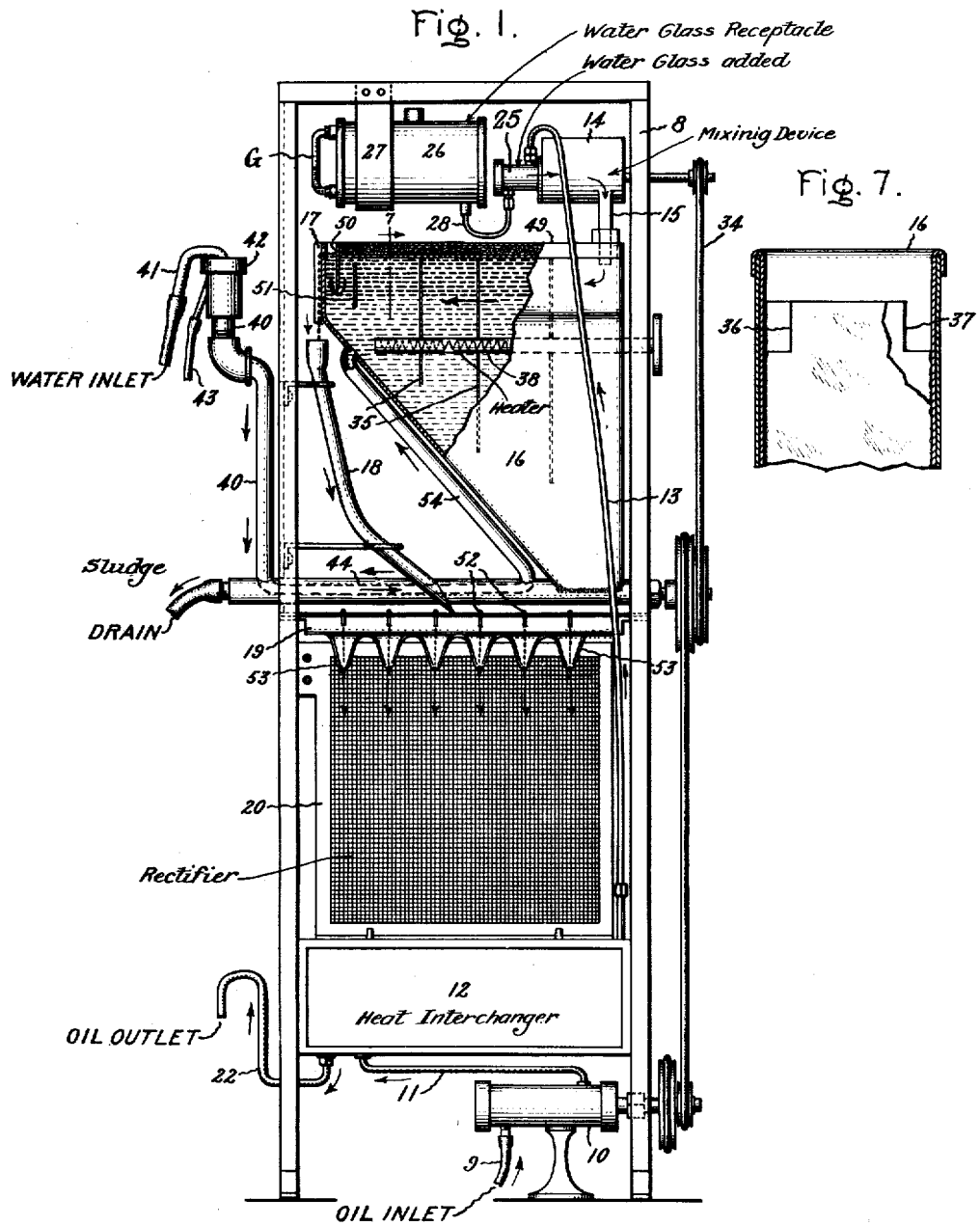

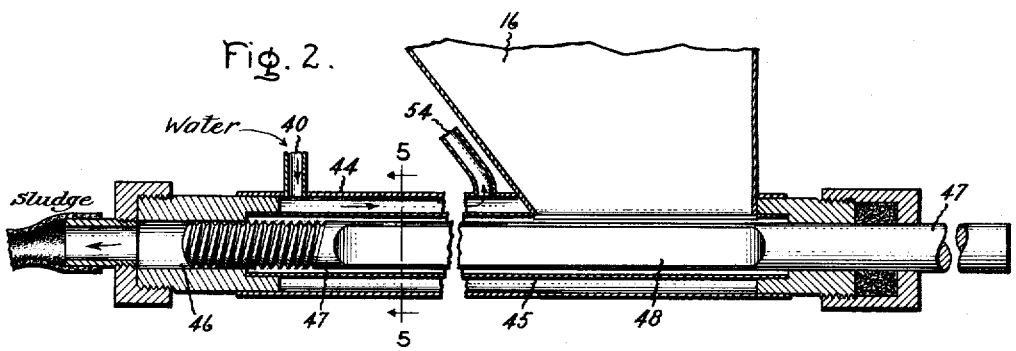
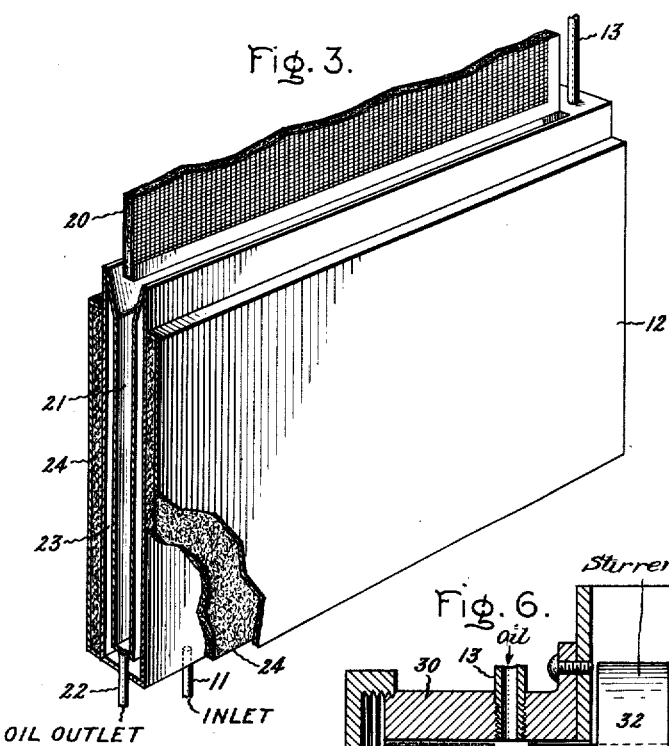
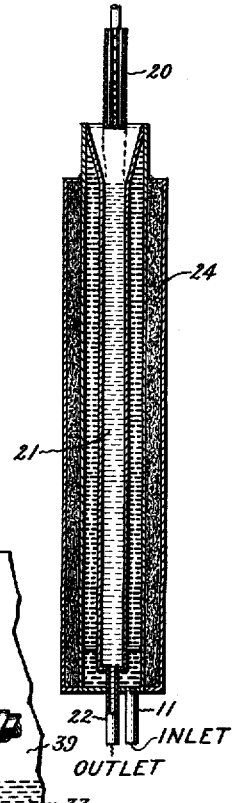
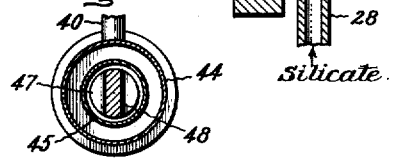

1,703,647

UNITED STATES PATENT OFFICE.

CHARLES G. VAN BRUNT, OF SCHENECTADY, NEW YORK, ASSIGNOR TO GENERAL ELECTRIC COMPANY, A CORPORATION OF NEW YORK.

METHOD AND APPARATUS FOR CLARIFYING OIL.

Application filed October 29, 1924. Serial No. 746,640.

This application is a continuation in part of my prior application Serial No. 503,016, filed September 24, 1921.

The present invention relates to purification of a mineral oil containing finely divided solid matter in suspension, such for example, as is found in used lubricating oil.

My invention is particularly applicable to the clarification of used oil withdrawn from the crank case of automobiles or other internal combustion engines. The suspended matter of spent lubricating oil consists largely of carbonaceous matter, abraded metal and road dust, together with some moisture. It is so finely divided that it settles only with extreme slowness.

In accordance with my invention the suspended matter is removed from the oil by treatment with a weakly basic, hydrophilic material, such, for example, as the "water glass" of commerce (sodium silicate), which is capable of agglomerating the suspended matter. When distributed as fine globules throughout the oil, the water glass either by itself, or in combination with certain impurities in the used oil forms a sludge with the suspended foreign particles which settles in the oil.

When, in accordance with one of the features of my invention the oil-water glass mixture is brought into contact with water, the sludge is extracted from the oil by the water, or in other words the water glass together with the solid matter subsides into the water, leaving a clean oil which may be used again, particularly after the diluents introduced during use have been removed.

In accordance with another feature of my invention, the above process is carried out at an elevated temperature, say, at 70° to 80° C. in order to hasten the removal of the sludge. The stimulation by heating of the forces involved in the process renders convenient the gravitational separation of the solid matter by a continuous process which constitutes another feature of my invention. The mixture of impure oil and water glass is caused to flow over a body of water into which the silicate sludge subsides the clarified oil and the sludge being carried away separately.

My invention also includes an apparatus whereby the various steps of my process are carried out in proper sequence. This apparatus is so combined with an evaporator for removing diluents (which is described and claimed in copending application Serial No. 572,601, filed by Van Brunt and Miller) that the heat introduced by the evaporator is utilized to accelerate the clarification process.

These and other features of my invention are described in the following specification taken in conjunction with the accompanying drawings which show in Fig. 1 a side elevation partly in section of a complete unit of an oil recovery apparatus with the side wall removed; Fig. 2 illustrates in longitudinal section a device for controlling the outflow of water which carries away the sludge; Fig. 3 is a perspective view partly in section of a preheating device; Fig. 4 is a vertical cross-section of the preheater; and Figs. 5, 6 and 7 are detail views of parts of the apparatus to be later described, Fig. 5 being a cross-section taken on lines 5—5 of the piping of a pump shown in Fig. 2, Fig. 6 being a longitudinal section of a pump for delivering water glass and Fig. 7 being a side elevation of weir plates in the apparatus, these being shown in part broken away.

As shown in Fig. 1 the parts of the apparatus are assembled vertically within a frame 8 so as to cause the oil to progress by gravity both through the extraction device for removing the solid matter and also the evaporating device for removing diluents so as to restore the viscosity of the used oil. As oil is discharged in a heated condition from the latter device provision is made to utilize this otherwise wasted heat in a heat interchanger. Except for this utilization of heat, my present invention is independent of the treatment required to remove diluents. The device for carrying out this removal, however, has been shown in the drawing so as to explain the workings of the complete recovery apparatus in all its relations. Before describing in detail the parts of the extraction device for removing solid matter, the apparatus will be briefly described as a whole.

The relation of the various parts of the apparatus may be best understood by reference to Fig. 1. As here shown the dirty oil is drawn through a conduit 9 from a storage device (not shown) by a pump 10, which delivers the oil at a predetermined rate through a conduit 11 to a heat interchanger 12, from whence it is carried by a conduit 13 to a mixing device 14 where water glass is introduced, forming a sludge. The oil with the suspended sludge is brought by a conduit 15 into contact with a body of water contained in a V-shaped tank 16. The sludge particles settle in the oil, and when coming into contact with the water, are wetted and extracted from the oil. The purified oil is discharged from the extraction tank at an overflow 17 by a conduit 18 into a trough-shaped distributor 19, whereby the oil is fed to the evaporator 20 where the diluents are removed. As best shown in Figs. 3 and 4 the recovered warm oil passes from the evaporator into a chamber 21 of the heat interchanger and is finally discharged through an outlet pipe 22. The warm purified oil in the chamber 21 gives up some of its heat to the incoming unpurified oil in the surrounding chamber 23. The surrounding heat insulating wall 24 conserves the heat in the interchanger.

Turning now to the parts of the apparatus whereby solid matter is removed, it should be observed that the water glass is stored in a tank 26 supported by a bracket 27 from the frame 8. A gauge G has been shown to indicate the level of water glass in the tank. The water glass is drawn from this tank by a pump 25 through a pipe 28. The pump 25 is shown in section in Fig. 6. This pump comprises a rotating shaft 29 on which is formed a helical groove, as indicated, and which rotates with a close clearance within a housing 30. The oil and the water glass solution are drawn by this pump at a predetermined rate and proportion into a chamber 31. The water glass is fed through the helical groove in the shaft into the oil, the latter being supplied by a tube 13, as already stated above. The silicate solution thus is protected by oil from evaporation, and this prevents the concentrated silicate solution from hardening and clogging the feed ducts. The pump and mixing device, together with other rotating parts of the apparatus are driven by suitable belting 34 from a common source of power (not shown).

The silicate solution must be broken up into fine droplets which are dispersed in the oil, and thus present a large reactive surface. If the disintegration of the silicate is carried too far, an emulsion results which is not favorable for rapid separation from the oil. It is also desirable to entrain in the silicate-oil mixture a certain amount of air as fine bubbles. To fulfill both these conditions a stirrer 32 is provided which consists of a cylinder which is mounted on the shaft 29 and dips into the oil-silicate mixture in the mixture chamber 39. It should be noted that above the oil layer 33, an air space is provided, the mixing chamber 39 being open to the air, as shown in Fig. 6. Although the exact form and speed of the stirrer will vary with the conditions, it may be said that when using a common commercial form of water-glass (such as a water glass having a content of 19.4% $Na_2O$ and 30.6% $SiO_2$ and a gravity of 58° Baumé), a stirrer may be used consisting of a simple cylinder about 1⅝" in diameter, rotating about one-third immersed in the mixture with a clearance of 1/16" from the bottom of the mixer and rotated with a peripheral speed of about 125 feet per minute. This speed is insufficient to cause the oil to be agitated so violently as to form an undesired emulsion. I wish to state at this point that it is not essential that this particular form of mechanism should be used in the practice of my invention, for example, it has been satisfactory with other grades of silicate to mix the water glass with the oil by the use of simple paddles, and I mean to designate by the term "paddle" any device of the designated form which agitates the oil and is constructed to agitate the oil at its surface.

The proportion of oil and water glass will also vary with the conditions, but I have found that a proportion of approximately 50 parts of oil to 1 part of water glass by volume is generally satisfactory. For the purification of some kinds of used oil it is desirable to add to the oil before introducing the water glass a resinous material as for example, ordinary rosin or colophony to the extent 1/10% by weight and conveniently as a solution of the rosin in benzol or other suitable solvent. This feature of my invention is described and claimed in my copending application Serial No. 696,655. In some cases the addition of a resinate of a heavy metal, preferably manganese resinate, is superior to rosin. A small proportion of stearic acid or similar acid in amounts of about one-tenth per cent by weight may be added. A mixture of manganese resinate and stearic acid may be introduced as a 20% benzol or oil solution which is so proportioned with respect to the volume of the oil that about 1 part of the resinate to 200 parts by weight of the unpurified oil are introduced. This improvement is described and claimed in another copending application Serial No. 721,609. These additions of rosin or resinate increase the rapidity of separating and otherwise facilitates the clarification process. The water glass preferably is used at as high concentrations as compatible with the fluidity which will permit satisfactory feeding and mixing. I have used an aqueous water glass solution of the above character having a density or gravity of about 48 to 50° Bé. which is about 1.50 to 1.53 specific gravity. Ordinary crank case oil has a specific gravity of about .87 to .90. In this variety of commercial water the ratio of $Na_2O$ to $SiO_2$ is about one to one and one-half.

The water glass has a two-fold action upon the oil. By virtue of its alkaline character it neutralizes acid substances formed in the oil by oxidation and forms soaplike bodies which are either soluble in water or capable of being wetted by water, thus removing these deleterious substances from the oil with the sludge. In this respect the action of the water glass is chemically unlike its action as a water-softening agent for breaking natural emulsions of crude petroleum containing brine. Spent lubricating oil is non-saline. Secondly, by virtue of its colloidal nature, which is probably modified and aided by the soap-like bodies together with the added resinous bodies, it collects or agglomerates and envelopes the suspended carbonaceous material together with other solid matter present, and forms comparatively large particles which are capable of being wetted by water or are hydrophilic in character. Silica, which is known to be held in colloidal suspension in water glass, is capable of causing the carbon particles and other impurities to lie within the aqueous phase. These agglomerates of dirt and water glass are readily extracted as a sludge by water from the oil. The relatively high specific gravity of the water glass which is associated with the sludge particles speeds the rate of settling of the sludge in the oil. The action of the water glass in agglomerating the fine suspended solid matter to form a sludge is greatly stimulated by moderately elevated temperatures. At temperatures of about 70° to 80° C. the settling action occurs with sufficient rapidity to permit the extraction process to be carried out continuously in a settling device, such as shown at 16 in the drawing.

This device consists of a narrow vertical tank which contains a number of vertical baffle plates or weirs, as indicated at 35. These weir plates are provided with notches at their ends located at opposite sides for the successive weirs as indicated at 36 and 37 in Fig. 7, to provide a path for the flow of oil past the baffle plates. When the oil-water glass mixture is introduced at the right hand side of the settling tank by the conduit 15, it flows slowly to the left as a layer indicated by the heavy dotted lines through the alternating openings in the weirs over a body of water which is indicated by light dotted lines. The baffle plates prevent currents in the oil and undesired mixing of the unclarified and clarified portions of the oil. Although as already described, some heating of the oil occurs in the heat interchanger 12, it is desirable to maintain the desired temperature to further heat the water and oil in the settling tank, as indicated, by the electric heater 38.

With a given specific gravity of oil, a consant interfacial level of water and oil in the settling tank is maintained by a stand pipe 40 in which water is maintained at constant head by excess supply from a pipe 41, the excess running into the surrounding jacket 42 from which it is drained off by another pipe 43.

Although some water is introduced into the settling tank together with the oil both as a solvent for the silicate and as suspended or emulsified water present in the oil, and this additional water of course is added to the water in the settling tank, a constant level of water is accurately maintained by the overflow in the stand pipe 40. In other words, the water in the stand pipe is balanced against a column of water and oil of a given height no matter what the source of the water may be.

As shown in Fig. 2, the pipe 40 terminates at the bottom in a large pipe 44 which surrounds an outflow pipe 45 (see sectional view, Fig. 5). From the jacketing pipe 44 the water flows through a pipe 54 into the settling tank at a point opposite the heater 38. Through the discharge pipe 45 a predetermined amount of sludge from the bottom of the extraction tank is constantly removed through a port 46 and is discharged into a drain, as indicated. The inflowing water from the pipe 40 therefore extracts most of the heat from the outflowing sludge in pipe 45, thus conserving the heat input. The outflow 46 of sludge in the pipe 45 occurs through a capillary groove cut in the end of the shaft 47 which is rotatably mounted within the pipe 45. This shaft is rotated at a moderate rate which keeps the groove from clogging. There is also some pumping action due to the helical form of the groove, but this is not essential. The outflow may be adjusted to a desired rate by moving the threaded shaft in and out of the bearing, so as to vary the length of the capillary passage through which the sludge flows. The shaft 47 has a flattened cross section, as indicated at 48, Fig. 5, to promote the disintegration of sludge masses at the bottom of the settling tank.

The depth of the oil layer in the tank and the rate of flow of the oil should be so adjusted that little or no stirring effect is produced. The width of the clarifying tank is so chosen that the time during which the oil is retained in the tank is ample to allow complete removal of the sludge by the water. For example, a given particle of oil should move through the tank in about an hour's time. The contact of the upper surface of the oil with the heat insulated cover 49 assists in the prevention of eddy currents and stirring of the oil. To prevent variation in the rate of outflow of the oil due to variation in specific gravity of the oil, an inverted dam 50 is provided which extends downwardly into the oil from the cover 49 and under which the oil must flow before it can be discharged from the settling tank. If the specific gravity of the oil varies, the level of the oil and water interface in the space between the dam 50 and the overflow 17 will vary. For example, in the case of a lighter oil the water level will rise within the space, but otherwise the depths of the oil will remain at least to the bottom of the inverted dam 50. To prevent the overflowing oil to be taken from the lower portion of the oil layer, a second dam 51 is provided over which the oil must flow before it can flow under the dam 50. This second dam also prevents any sludge at the oil-water interface from leaving the apparatus with the overflowing oil.

The purified oil delivered by the tube 18 into the trough 19 flows over the sides of the trough and a uniform distribution of the overflow is secured by the presence of a number of metal guides 52 which are loosely in contact with the sides of the trough and extend from the oil within the trough to the outside of the trough, as indicated. The oil creeps between the capillary space between these guides and drips from the pointed distributors 53 upon the evaporator plate 20. As described in the above-identified copending application Serial No. 572,601, this evaporator is a plate-shaped body provided on the outside with ridges and grooves of capillary dimension and provided on the inside with an electric heater, the temperature varying from about 150° C. at the bottom to about 125° C. at the top of the plate. By passing over this heated surface the gasoline and other diluents in the oil are evaporated. The purified oil passing off through an outflow pipe 22 is already described.

By the described apparatus the dirty, diluted used oil drained from the crank case of an automobile or other device can be clarified and otherwise restored in its physical properties so as to be usable with as good or even better results than unused oil.

Various changes may be made within the spirit of my invention. For example, silicates of other alkali metals may be used instead of sodium silicate, and if desired, the extraction process can be carried out by an intermittent process in a simple settling tank from which the purified oil is drawn off as a single operation when the extraction of impurities has been completed.

While I have described my invention with particular reference to the purification of lubricating oil which has become contaminated by use, I wish it to be understood that it is also applicable to other forms of liquid petroleum derivatives, such for example, as transformer oil which has become sludged by use at high temperatures, and I wish by the descriptive phrase "contaminated used oil" to include various forms of mineral oil which have been contaminated by use as distinguished from natural or crude petroleum emulsions.

What I claim as new and desire to secure by Letters Patent of the United States is:

1. The process of removing finely divided suspended material from used mineral lubricating oil, which consists in dispersing in said used oil droplets of a concentrated aqueous solution of water glass, and bringing into contact with the mixture a sufficient quantity of water to cause the suspended matter to be taken up by the water.

2. The process of eliminating substantially non-aqueous, non-saline, organic oxidation products from a used mineral oil, which consists in dispersing an aqueous solution of water glass as fine droplets in said oil thereby forming a sludge of said impurities, and separating the sludge from the oil.

3. The process of eliminating suspended impurities from used mineral lubricating oil, which consists in dispersing in said oil an aqueous solution of water glass which is sufficiently concentrated to form a sludge with said impurities capable of being wet by water, bringing the resulting mixture into contact with water for a sufficient length of time to cause the sludge to be extracted from the oil by the water, and separating the purified oil from the water.

4. The process of eliminating suspended impurities from used mineral lubricating oil, which consists in dispersing an aqueous solution of water glass as fine droplets in said oil at a temperature of about 70° to 80° C., thereby forming a sludge of said impurities capable of being wet by water, bringing the resulting mixture into contact with water for a sufficient length of time to permit the sludge to be withdrawn from the oil by the water, and separating the purified oil from the water.

5. The process of clarifying used crank case lubricating oil, which consists in dispersing droplets of an aqueous water glass and air bubbles in said oil, and bringing said mixture into contact with a layer of water at a temperature materially above room temperature thereby causing the suspended matter to be taken up by the underlying water layer leaving a clear oil.

6. The process of removing suspended impurities from used crank case lubricating oil, which consists in heating said oil to about 70° to 80° C., mixing with said oil as small droplets an aqueous solution of water glass of such concentration that a hydrophilic sludge is formed, the amount of water glass being about one-fiftieth of the oil by volume, and flowing the oil at such rate and for such distance over a body of water that the sludge is extracted from the oil.

7. The process of purifying used mineral lubricating oil, which consists in dispersing a concentrated aqueous solution of water glass in said oil, thereby forming sludge particles which are heavier than said oil and gravitationally removing said sludge particles from the oil.

8. The process of eliminating suspended solid matter from used mineral lubricating oil which consists in associating said solid matter with globules of an aqueous solution of a silicate of an alkali metal, thereby forming a sludge, bringing the oil containing sludge into contact with water to extract said sludge, and after extraction of the sludge separating the purified oil from the water.

9. The process of reclaiming contaminated used oil, which consists in dispersing therein droplets of an aqueous solution of water glass, entraining air together with said water glass, and removing the resulting precipitate.

10. An apparatus for removing foreign matter from used oil, comprising a conduit for delivering the used oil, a second conduit for delivering a liquid agglomerating agent, a mixing chamber, positive acting feed means for introducing said oil and agglomerating agent continuously in predetermined proportion into said chamber, saddle means in said chamber for causing said agent to be suspended in said oil as fine droplets, and means for removing said agent from the oil together with foreign matter agglomerated thereby.

11. An apparatus for removing foreign matter from used oil, comprising a conduit for delivering the used oil, a second conduit for delivering a liquid agglomerating agent, means for introducing said oil and agglomerating agent continuously in predetermined proportion into said chamber, means in said chamber for causing said agent to be suspended in said oil as fine droplets, a clarifying tank provided with a weir comprising a plurality of plates each of which is provided with an opening through which the oil containing suspended agglomerating agent may pass, means for maintaining in said tank a flow of water at a substantially constant level, and means for withdrawing oil which has flowed past said partitions.

12. An apparatus for removing foreign matter from used oil, comprising a conduit for delivering the used oil, a second conduit for delivering a liquid agglomerating agent, a pump having a shaft provided with a helical groove communicating with said conduits, an outlet conduit communicating with said groove, a mixing chamber communicating with said outlet, means in said mixing chamber for emulsifying said agglomerating agent in the oil, and means for removing the sludge formed by said agent and foreign matter in the oil.

13. An apparatus for removing suspended matter from used oil, comprising a conduit for delivering said oil, a second conduit for delivering a liquid agglomerating agent, a pump having a shaft provided with a helical groove communicating with said conduits, an outlet conduit also communicating with said groove, a mixing chamber communicating with said outlet conduit, means in said chamber for emulsifying said agglomerating agent, a settling tank communicating with said mixing chamber, said tank having an inclined bottom, a plurality of vertical partitions in said settling chamber, said partitions being provided with openings, the openings of the successive partitions being located at opposite sides to provide a sinuous path for the flow of oil, means for maintaining an extraction liquid at a substantially constant level in said settling tank intermediate the top and bottom of said partitions, means for withdrawing purified oil from said tank, and means for withdrawing sludge at the lowermost level in said tank.

14. An apparatus for removing sludge from used lubricating oil, comprising a mixing chamber, means for delivering said oil and a clarifying agent in predetermined proportion to said chamber, means for heating said oil, a paddle means in said chamber for dispersing said clarifying agent as droplets in said oil, an extraction tank communicating with said mixing chamber, means for flowing a scavenging liquid through said tank in contact with said oil, means for heating said liquid, weirs in said tank for causing the oil to flow in a sinuous path in contact with said liquid, and for separately withdrawing purified oil and sludge from said tank, and means for maintaining the level of said liquid substantially constant.

15. The step in the process of removing finely divided suspended matter from used mineral oil, which consists in agglomerating said matter with an aqueous solution of a silicate of an alkali metal.

16. The method of purifying impure used mineral oil containing finely divided carbon which comprises dispersing throughout the oil an aqueous solution of water glass having a weak alkaline reaction, and having the property when in contact with the oil of agglomerating impurities of the oil, and separating from the oil impurities and the aqueous phase of the resulting mixture.

17. The method of purifying impure used mineral oil that contains finely divided carbonaceous material and acid substances formed in the oil by oxidation which comprises dispersing throughout the oil an aqueous solution of water glass having an alkaline reaction of such concentration that said impurities are collected to form a sludge, and separating said sludge from the oil.

18. The method of purifying impure used mineral oil that contains finely divided carbonaceous material and oxidation products produced by use which comprises dispersing throughout the oil water glass of such concentration that said impurities become agglomerated with said reagent, and separating the aqueous phase and impurities from the oil.

19. The method of purifying used mineral oil which comprises dispersing throughout the oil an aqueous solution containing a sufficient concentration of sodium silicate having substantially the composition one part $Na_2O$ to 1.6 parts $SiO_2$ and separating from the oil impurities and the aqueous phase of the resulting mixture.

20. The method of purifying impure oil containing finely divided carbon which comprises dispersing throughout the oil an aqueous alkaline reagent capable of being easily dispersed within the oil and having the property of facilitating the passage of carbonaceous impurities from the oil into the aqueous phase of the resulting mixture and containing in suspension a colloidal substance capable of causing the carbon to lie within the aqueous phase, and separating the aqueous phase from the oil.

21. The method of purifying impure oil containing finely divided carbon which comprises dispersing throughout the oil an aqueous reagent having a weak alkaline reaction capable of being easily dispersed within the oil and having the property of facilitating the passage of carbonaceous impurities from the oil into the aqueous phase of the resulting mixture, and separating the aqueous phase from the oil.

In witness whereof, I have hereunto set my hand this 28th day of October, 1924.

CHARLES G. VAN BRUNT.

CERTIFICATE OF CORRECTION.

Patent No. 1,703,647.           Granted February 26, 1929, to

CHARLES G. VAN BRUNT.

It is hereby certified that error appears in the printed specification of the above numbered patent requiring correction as follows: Page 1, line 5, before the word "mineral" strike out the article "a"; page 3, line 91, after the word "flow" strike out the number "46"; page 5, line 18, claim 10, for the word "saddle" read "paddle", and line 82, claim 14, strike out the word "means"; and that the said Letters Patent should be read with these corrections therein that the same may conform to the record of the case in the Patent Office.

Signed and sealed this 26th day of March, A. D. 1929.

(Seal)

M. J. Moore,
Acting Commissioner of Patents.

ficient concentration of sodium silicate having substantially the composition one part Na₂O to 1.6 parts SiO₂ and separating from the oil impurities and the aqueous phase of the resulting mixture.

20. The method of purifying impure oil containing finely divided carbon which comprises dispersing throughout the oil an aqueous alkaline reagent capable of being easily dispersed within the oil and having the property of facilitating the passage of carbonaceous impurities from the oil into the aqueous phase of the resulting mixture and containing in suspension a colloidal substance capable of causing the carbon to lie within the aqueous phase, and separating the aqueous phase from the oil.

21. The method of purifying impure oil containing finely divided carbon which comprises dispersing throughout the oil an aqueous reagent having a weak alkaline reaction capable of being easily dispersed within the oil and having the property of facilitating the passage of carbonaceous impurities from the oil into the aqueous phase of the resulting mixture, and separating the aqueous phase from the oil.

In witness whereof, I have hereunto set my hand this 28th day of October, 1924.

CHARLES G. VAN BRUNT.

CERTIFICATE OF CORRECTION.

Patent No. 1,703,647.                                  Granted February 26, 1929, to

CHARLES G. VAN BRUNT.

It is hereby certified that error appears in the printed specification of the above numbered patent requiring correction as follows: Page 1, line 5, before the word "mineral" strike out the article "a"; page 3, line 91, after the word "flow" strike out the number "46"; page 5, line 18, claim 10, for the word "saddle" read "paddle", and line 82, claim 14, strike out the word "means"; and that the said Letters Patent should be read with these corrections therein that the same may conform to the record of the case in the Patent Office.

Signed and sealed this 26th day of March, A. D. 1929.

(Seal)

M. J. Moore,
Acting Commissioner of Patents.